United States Patent [19]

Miller

[11] 4,321,037
[45] Mar. 23, 1982

[54] METHOD OF ILLUSTRATING HOW THE OUTSIDE OF A BUILDING WILL APPEAR TO THE VIEWER IF A BUILDING MATERIAL IS ADDED TO THE OUTSIDE OF THE BUILDING

[76] Inventor: Melvin L. Miller, 395 Highland Dr., Payette, Id. 83661

[21] Appl. No.: 195,442

[22] Filed: Oct. 9, 1980

Related U.S. Application Data

[63] Continuation of Ser. No. 958,068, Nov. 6, 1978, abandoned.

[51] Int. Cl.$^3$ ............................................. G09B 25/04
[52] U.S. Cl. ................................................... 434/74
[58] Field of Search ....................... 35/7 R, 16, 26, 53, 35/54; 96/41, 43; 156/299, 300; 354/291; 434/72, 90, 74, 79, 80, 87, 75, 81, 85, 153, 430; 33/1 B, 1 F, 1 G, 174 B, 477

[56] References Cited

U.S. PATENT DOCUMENTS

| | | |
|---|---|---|
| 572,216 | 12/1896 | Patton . |
| 1,088,396 | 2/1914 | Bissell . |
| 1,187,881 | 6/1916 | Armstrong . |
| 2,259,435 | 10/1941 | Collins . |
| 2,294,131 | 8/1942 | Raymond . |
| 2,339,044 | 1/1944 | Barrett . |
| 2,494,072 | 1/1950 | Veterli . |
| 2,610,413 | 9/1952 | Dasey . |
| 2,878,586 | 3/1959 | Ohlsson ............................. 434/80 |
| 3,559,306 | 2/1971 | Winans . |
| 3,817,614 | 6/1974 | Equini . |

FOREIGN PATENT DOCUMENTS 2365172 5/1978 France .

Primary Examiner—Harland S. Skogquist
Attorney, Agent, or Firm—William D. Hall

[57] ABSTRACT

This invention contemplates providing a number of sheets showing different building materials. Each different building material is illustrated in different scales on different sheets respectively. When a customer wishes to see the way his building would look with a particular building material on it, a photograph of his building is taken and one of said sheets, to the proper scale, is applied over the photograph. It would, however, overlie only that portion of the building which is to be covered by the new material. In that way the customer sees how his building will look with any or all various different materials placed over the outside of his building.

When the building material, to be applied to an existing building, is available in different colors, a sheet representing the desired color may be placed between the photograph and the sheet representing the desired building material. One or more of the overlays, representing different building materials, may be placed upon different parts of a given building, to illustrate different possible designs.

11 Claims, 7 Drawing Figures

FIG. 2
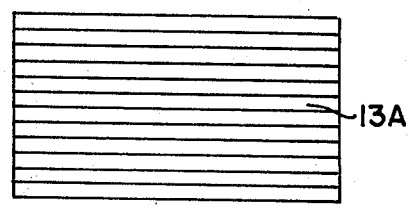
FIG. 3
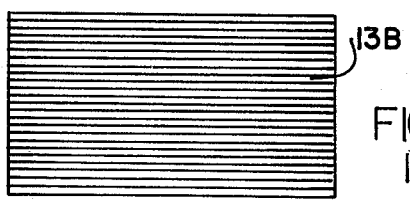
FIG. 4
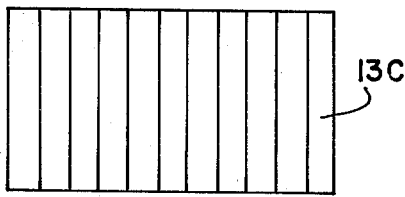
FIG. 5
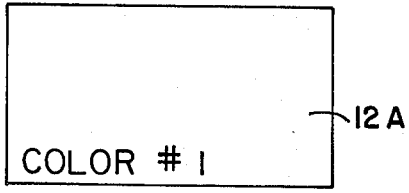
FIG. 6
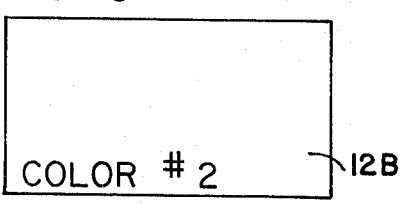
FIG. 1
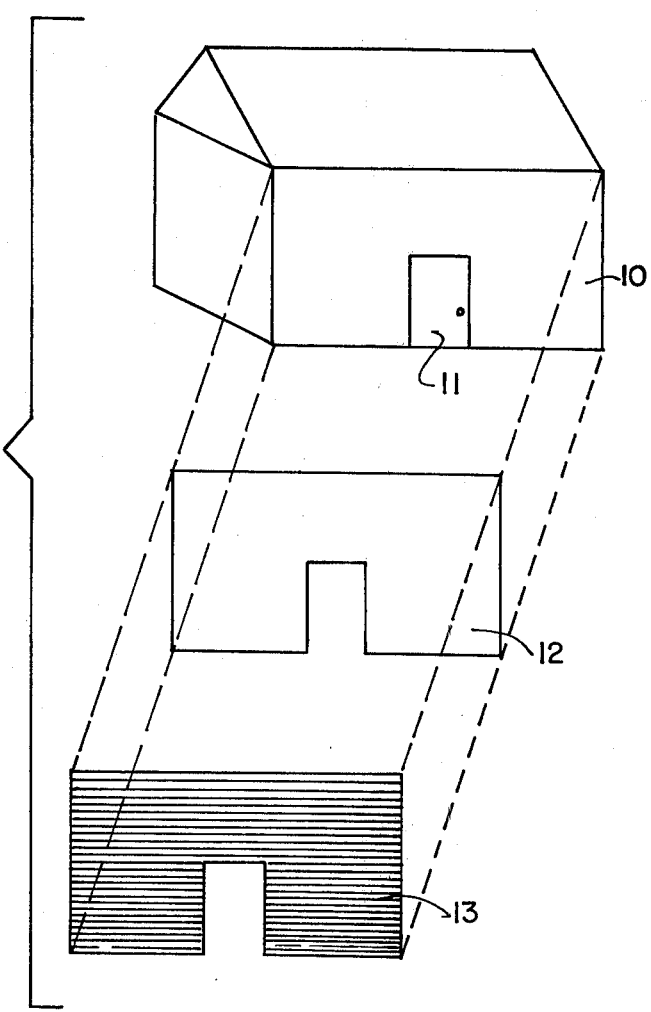
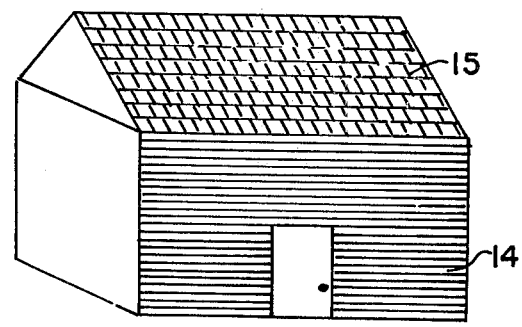
FIG. 7

METHOD OF ILLUSTRATING HOW THE OUTSIDE OF A BUILDING WILL APPEAR TO THE VIEWER IF A BUILDING MATERIAL IS ADDED TO THE OUTSIDE OF THE BUILDING

This is a continuation of application Ser. No. 958,068, filed Nov. 6, 1978 now abandoned.

BACKGROUND OF THE INVENTION

There are many building materials available for improving the external appearance of a house, building or other structure. However, the owner of the house or the person who is having improvements made to his house, sometimes has difficulty visualizing how a house will look if it is improved by the addition of a particular building material. The conventional way of solving the problem is for the builder, or for the building supply dealer, to show the customer pictures of other houses or buildings made of various and sundry building materials. In this way, the customer hopefully will gain some insight into the way his house, or other structure, will look after the building material he selects has been added. However, this clearly fails to show the customer how his own house will appear if it is improved by the addition of a particular building material.

There have been many prior art techniques that perhaps might have been helpful to the builder, or other building supply dealer, to aid the customer. For example, composite photographs, wherein two different photographs are pieced together in an effort to create a single photograph are widely known. Such, however, has not been applied to the sale of building materials of houses or other structures.

SUMMARY OF THE INVENTION

The owner of an existing building may wish to see how his building would appear if a particular building material was applied to it. Similarly, he may wish to compare the appearance of his building if each of several different building materials is applied. This will enable him to select the building material that appeals to him.

To accomplish the foregoing, a photograph, or other illustration is prepared of his building. The building supply dealer also provides a plurality of sheets each illustrating a different building material. Moreover, for each building material, there are sheets showing that building material to different scales. The building supply dealer may then cut these sheets to fit the portion of a picture of the house, or other building, to which the building material is to be added. The customer may then see how his house (or other building) will appear, if the various building materials depicted by said sheets are applied to his house.

In some cases, the customer may wish to know how a material would appear if one building material were applied to one outside portion of his house and another building material was applied to another outside portion of his house. In such a case a sheet representing the first building material would be applied to the first portion of the photograph of the house and a sheet representing the second building material would be applied to the second portion of the photograph of the house.

The different sheets for each building material are printed to different scales so that by selection of the proper sheet, the ultimate picture illustrates the house, and the building material applied thereto, to the proper scale.

Some building materials come in different colors. In order to show the color the sheets representing the various building materials are at least partly transparent. For example, they may be translucent. If it is desired to illustrate how a given color of building material would appear as applied to a given house, a sheet representing that color would be placed over the house or other building. The sheet representing the building material then overlays the colored sheet. Since both are cut to the same size and shape, the customer will see how the particular building material will appear on his house. The customer may, of course, repeat the process utilizing different colors so that he can select the color that he prefers.

BRIEF DESCRIPTION OF THE DRAWINGS

FIG. 1 is a schematic showing of the steps involved in practicing the method of this application.

FIG. 2 illustrates one particular sheet representing one given building material, such as aluminum siding.

FIG. 3 is a figure similar to FIG. 2 but it shows siding to different scale.

FIG. 4 is similar to FIG. 3, however, the siding is shown to extend vertically instead of horizontically.

FIG. 5 shows a sheet of solid color and is labeled "Color #1".

FIG. 6 is similar to FIG. 5 but is labeled "color #2".

FIG. 7 illustrates the house of FIG. 1 after the process has been completed.

DETAILED DESCRIPTION OF THE INVENTION

If it be assumed that the owner of a house that has a front door wishes to know how his house would look if various building materials are applied thereto, the building supply dealer would, according to this invention, proceed as follows. First, a suitable photograph 10 would be made of the house. The photograph would show details such as the front door 11. If the building supply dealer wishes to illustrate how the house would look with white aluminum siding, he would first cut white sheet 12 conforming to the shape of the front of the house. He would then apply that sheet to the portion of the photograph 10, representing the front of the house. He would next select a sheet illustrating a siding material. However, since photographs may be large or small, and since siding material may come in various widths, the selection would be made among various sheets such as 13A and 13B which would show the siding material drawn to various scales. After the proper scale has been selected to illustrate the siding material, that sheet, showing the building material, would be cut to the proper shape and would constitute sheet 13 of FIG. 1. It would then be applied as an overlay to the color sheet 12. As a result, the customer would see a modified photograph 14 (FIG. 7) showing how his house would look with a particular siding material on it.

While I have shown in FIGS. 2, 3 and 4 building materials that represent aluminum siding, it is understood any other suitable building material could be illustrated. For example, there could be sheets showing imitation bricks. In this case the sheets would be printed to different scales so that they could be applied to photographs of different sizes to thus illustrate the imitation bricks in proper proportion to the house or other building. Similarly, roofing material could be illustrated. One such building material would be a cedar shake roof. Therefore, sheets similar to FIGS. 2 and 3, illustrating cedar shake roofs could be provided to different scales. When building materials come in different colors, suitable colored sheets, such as sheets 12A and 12B, one for each color of building material, should be available.

It is sometimes desirable to put one building material on one outside portion of the house and another building material on another outside portion of the house. In such a case, the aforesaid method would be followed, by applying one sheet, for example, that of FIG. 2, to a first portion of the picture and a second sheet, for example, that of FIG. 4, to a second portion of the picture.

Similarly, by following the aforesaid procedures, the customer can be shown how his house would look under various and sundry circumstances and conditions. For example, he could be shown how his house would look with bricks across the front, aluminum siding along one side of the house and a cedar shake roof. Alternatively, he could be shown how the house would look with vertical aluminum siding on the front and a slate roof.

The various sheets may respectively contain labels as to the product that they represent and may have notations to give an indication of the scale to which the building material on the sheet is drawn.

In FIG. 7 slate roofing material is also illustrated. The procedure for applying the illustration of slate to the roof is similar to the steps shown in FIG. 1. First a slate-colored sheet would be applied to the roof of the photograph, just as color sheet 12 was applied to the front of the house in FIG. 1. Secondly a translucent sheet 15 illustrating a slate roof, to the proper scale, would be selected and then applied to the portion of the photograph which illustrates the roof.

It is also possible for the overlay material 12 to be opaque. This type of material may be used when it is desired to follow the present method with only a single color.

I claim to have invented:

1. The method of using an illustration of a structure comprising a building to show how that structure would appear if a different building material is to be added to such structure comprising:
   providing a plurality of sheets illustrating said building material with each such sheet to a different scale,
   selecting the particular sheet which when applied to said illustration will be the closest approach to showing how said structure will appear if said building material is applied thereto,
   covering at least a portion of said illustration with at least a portion of said selected sheet to thereby show how said structure will appear if said building material is applied thereto.

2. In the method of claim 1 in which there are a plurality of sets of said sheets, each set illustrating a different building material, and each set including sheets that respectively illustrate its complementary building material to different scales, the step comprising:
   selecting the sheet to be applied to said illustration to represent a given building material to the correct scale.

3. The method of claim 1 comprising applying said particular sheet in such a manner that it does not change the shape of the structure but does change the appearance of at least a portion of the external surface of the structure to show the appearance of that structure if the surface of that portion comprises said building material.

4. In the method of claim 1, the step of providing a plurality of sheets comprising providing sheets representing different siding as the building material with different sheets showing the siding in different widths, and applying the sheets one at a time to the illustration so that the appearance of different widths of siding may be compared.

5. The method of claim 3 including the step of selecting a plurality of different ones of said sheets to not only represent different building materials but to represent those different building materials to different scales, and applying each of the sheets to said illustration.

6. In the method of claim 1 in which there are at least two different sheets representing two different building materials, the step of applying said different sheets to different parts of said illustration to show how said structure would appear if one building material is applied to one portion of the structure and another building material applied to another portion of said structure.

7. In the method of claims 1, 2, 3, 4, or 6, in which said sheets have at least some transparency, the step of placing a sheet that is in color over the illustration before the sheet showing the building material is applied, to thus illustrate the building material in color.

8. The method of claim 1 in which the step of providing a plurality of sheets comprises providing sheets to different scales of roofing material to be applied to cover the roof of the building and which when so applied is a substantially flat surface of the building.

9. The method of claim 1 in which the step of providing a plurality of sheets comprises providing sheets to different scales of a building material, such as siding or roofing, which when applied to the structure consists of a relatively flat outer building structure.

10. The method of claim 1, further comprising the step:
    providing a photographic picture of the structure to use as the illustration.

11. The method of claim 1, further comprising the step:
    producing said illustration, said illustration being of an existing structure.

* * * * *